United States Patent [19]

Kakuno et al.

[11] Patent Number: 4,779,154
[45] Date of Patent: Oct. 18, 1988

[54] FLOATING TYPE MAGNETIC HEAD HAVING GLASS BONDING GROOVE

[75] Inventors: Tsuyoshi Kakuno; Minoru Kamimura, both of Nagaoka, Japan

[73] Assignee: Alps Electric Co., Ltd., Japan

[21] Appl. No.: 923,299

[22] Filed: Oct. 27, 1986

[30] Foreign Application Priority Data

Oct. 29, 1985 [JP] Japan .............................. 60-166067[U]

[51] Int. Cl.⁴ .............................................. G11B 5/60
[52] U.S. Cl. ...................................... 360/103; 360/122
[58] Field of Search ............... 360/102, 103, 129, 122, 360/120, 123, 119

[56] References Cited

U.S. PATENT DOCUMENTS

| | | | |
|---|---|---|---|
| 3,577,634 | 5/1971 | Secrist | 360/103 X |
| 3,813,693 | 5/1974 | Gooch et al. | 360/119 |
| 4,636,900 | 1/1987 | Tung et al. | 360/103 X |

FOREIGN PATENT DOCUMENTS

| | | | |
|---|---|---|---|
| 0071812 | 6/1981 | Japan . | |
| 0127212 | 7/1984 | Japan . | |
| 0215022 | 12/1984 | Japan | 360/103 |

Primary Examiner—Robert S. Tupper
Assistant Examiner—Andrew L. Sniezek
Attorney, Agent, or Firm—Guy W. Shoup; Leighton K. Chong

[57] ABSTRACT

A floating type magnetic head includes a magnetic core which is secured to a slider. The magnetic core is secured to the slider by glass or a synthetic resin on the rail surface side. It is secured to the slider on the other side by heating and melting the glass rod placed on a groove which is provided on a wiring groove of the slider for receiving the glass rod, whereby the magnetic core is securely fixed to the slider, which leads to the stabilization of the properties of the head and the improvement of the reliability.

2 Claims, 1 Drawing Sheet

4,779,154

FLOATING TYPE MAGNETIC HEAD HAVING GLASS BONDING GROOVE

BACKGROUND OF THE INVENTION

The present invention relates to a floating type magnetic head suitable for a magnetic disk apparatus.

Various floating type magnetic heads which are, in use, float to a height of 0.3 to 0.5 μm from the surface of a magnetic recording medium.

An example of such conventional floating type magnetic heads is shown in FIG. 2. A floating type magnetic head 1 is composed of a slider 2 and a magnetic core 3 provided with a gap 3a. When the magnetic core 3 is secured to grooves 2c and 2d provided on the slider 2, they are bonded by glass on the rail surface side of the slider 2, whereas, on the other side 2b, they are left free or bonded by an adhesive or a synthetic resin, because the provision of glass involves a danger of the molten glass remaining in a winding groove 2e, which causes a trouble at the time of coil winding.

As a result, the prior art floating type magnetic head is poor in strength. If the opposite side 2b to the rail surface side is free, the fixture between the magnetic core 3 and the groove 2d is insecure, thereby involving a danger of the core being broken. On the other hand, if they are bonded by an adhesive or a synthetic resin on the side 2b, the susceptibility to heat of such agents leads to degradation of the properties of the head.

SUMMARY OF THE INVENTION

Accordingly, it is an object of the present invention to provide a floating type magnetic head which can stabilize the properties of the head and improve the reliability.

To achieve this aim, in a floating type magnetic head according to the present invention, when a magnetic core is secured to a slider, they are fixed by glass on the rail surface side, and on the opposite side, they are secured by heating and melting the glass rod placed on a groove which is provided on a wiring groove of the slider for receiving the glass rod, whereby the magnetic core is securely fixed to the slider, which leads to the stabilization of the properties of the head and the improvement of the reliability.

The above and other objects, features and advantages of the present invention will become clear from the following description of the preferred embodiment thereof, taken in conjunction with the accompanying drawings.

DESCRIPTION OF THE PREFERRED EMBODIMENT

An embodiment of the present invention will be described in detail in the following with reference to FIG. 1. The same numerals are provided for those elements which are the same as in the example of conventional heads shown in FIG. 2, and explanation thereof will be omitted.

Figure 1:
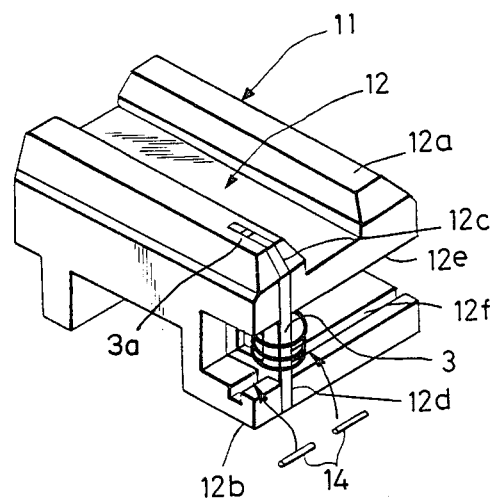
FIG. 1 is a perspective view of an embodiment of a floating type magnetic head according to the present invention.
Figure 2:
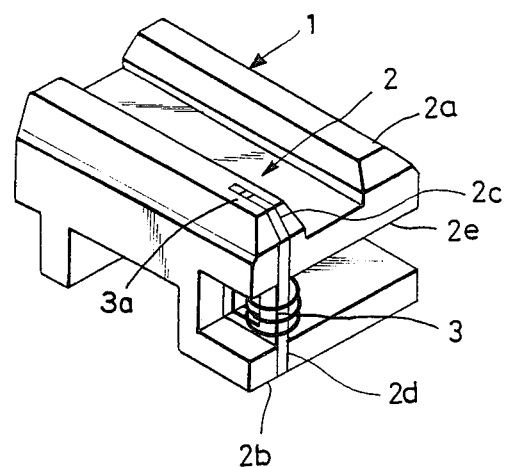
FIG. 2 is a perspective view of a conventional floating type magnetic head.

In FIG. 1, the reference numeral 11 denotes a floating type magnetic head in accordance with the present invention, and 12 a slider. The slider 12 is provided with grooves 12c and 12d leading from a rail surface side 12a to the opposite side 12b such as to be perpendicular to both surfaces in the same way as the prior art. On the inner wall of a winding groove 12e a groove 12f for receiving glass is formed by means of a wire saw or the like. The magnetic core 3 is inserted into the grooves 12c and 12d of the slider 12 and is fixed by glass on the rail surface side.

Thereafter, a glass rod 14 is placed in the groove 12f and heated and melted in a furnace, thereby fixing the magnetic core 3 to the slider 12 on the side 12b. It is noted that the glass of the glass rod 14 inserted in groove 12f should have a lower melting point than the glass used for securing the magnetic core 3 to the slider on the rail surface side.

Although the magnetic core 3 is first secured to the slider 12 on the rail surface side by the glass in this embodiment, it is also possible to first secure the magnetic core 3 to the slider 12 by heating and melting the glass rod 14 placed in the groove 12f and to next secure it to the slider 12 on the rail surface side 12a by a synthetic resin.

As described above, according to the present invention, the groove 12f for receiving a glass rod is provided in the wiring groove 12e of the slider 12, and the glass rod 14 is inserted into the groove 12f. Accordingly, when the glass rod 14 is melted in the furnace, the glass rod 14 is stationary and the magnetic core 3 is easily and securely fixed to the slider 12. Thus, the floating type magnetic head according to the present invention has high bond strength and heat resistance, stabilizes the properties of the head and improves the reliability.

While there has been described what is at present considered to be a preferred embodiment of the invention, it will be understood that various modifications may be made thereto, and it is intended that the appended claims cover all such modifications a fall within the true spirit and scope of the invention.

What is claimed is:

1. In a floating type magnetic head provided with a slider, having a rail surface side which is placed in parallel contact with a surface of a magnetic medium, an opposite surface side remote from the magnetic medium, a winging groove defining a space between the rail surface side and the opposite surface side in one side end of the slider, a first core insertion groove in the one end of the slider on the rail surface side, and a second core insertion groove in the one end of the slider on the opposite surface side, a magnetic core aligned in a plane extending in an upright direction between the rail surface side and the opposite surface side across the space of the winding groove, having a first end provided with a magnetic recording and reproducing gap held in the first core insertion groove and a second end held in the second core insertion groove, and a coil wound on the magnetic core in the winding groove, the improvement comprising a bonding groove formed in said opposite surface side of said slider extending parallel to a surface of the magnetic medium and perpendicular to said plane in which said magnetic core extends, a portion of said groove extends on each side of the magnetic core and communicating into the space of the winding groove, and glass bonding means including a glass rod placed in said bonding groove and melted to bond the second end of the magnetic core securely to said slider.

2. A floating type magnetic head according to claim 1, wherein said first end of said magnetic core is bonded in said first core insertion groove with a first glass, and said second end of said magnetic core is bonded in said bonding groove with a second glass having a lower melting temperature then said first glass.

* * * * *